US005621820A

United States Patent [19]
Rynderman et al.

[11] Patent Number: 5,621,820
[45] Date of Patent: *Apr. 15, 1997

[54] VIDEO DATA COMPRESSION METHOD AND SYSTEM WHICH MEASURES COMPRESSED DATA STORAGE TIME TO OPTIMIZE COMPRESSION RATE

[75] Inventors: Michel Rynderman, San Jose; Jay Cuccarese, Boulder Creek, both of Calif.

[73] Assignee: Radius Inc., Sunnyvale, Calif.

[*] Notice: The term of this patent shall not extend beyond the expiration date of Pat. No. 5,563,961.

[21] Appl. No.: 519,515

[22] Filed: Aug. 25, 1995

Related U.S. Application Data

[63] Continuation of Ser. No. 205,959, Mar. 3, 1994, Pat. No. 5,563,961.
[51] Int. Cl.[6] ............................................ G06K 9/40
[52] U.S. Cl. ...................... 382/239; 348/419; 358/430
[58] Field of Search ............................... 382/239, 305; 348/384, 419, 472, 390, 396; 358/426, 261.2, 430

[56] References Cited

U.S. PATENT DOCUMENTS

| | | | |
|---|---|---|---|
| 4,394,774 | 7/1983 | Widergren et al. | 382/56 |
| 4,706,260 | 11/1987 | Fedele et al. | 375/27 |
| 4,897,855 | 1/1990 | Acampora | 348/419 |
| 4,918,523 | 4/1990 | Simon et al. | 348/396 |
| 5,136,377 | 8/1992 | Johnston et al. | 358/136 |
| 5,159,447 | 10/1992 | Haskell et al. | 358/133 |
| 5,216,503 | 6/1993 | Paik et al. | 358/133 |
| 5,225,904 | 7/1993 | Golin et al. | 348/396 |
| 5,227,878 | 7/1993 | Puri et al. | 358/136 |
| 5,231,484 | 7/1993 | Gonzales et al. | 358/133 |
| 5,253,078 | 10/1993 | Balkanski et al. | 358/426 |
| 5,402,244 | 3/1995 | Kim | 358/430 |

OTHER PUBLICATIONS

VideoVision Studio v1.7 Upgrade Notes distributed by Radius Corporation (Mar. 1994).
Becky Waring, "Targa 2000", NewMedia, p. 30 (Mar. 1994).

Primary Examiner—Leo Boudreau
Assistant Examiner—Chris Kelley
Attorney, Agent, or Firm—Limbach & Limbach L.L.P.

[57] ABSTRACT

A method and system for processing and storing data in which the average time needed for storing the processed data in a storage device is automatically measured, and a processing parameter is optimized in response to the measured average storage time. In some embodiments, the invention compresses and stores video data, automatically measures the average time needed for storing the compressed video in a storage device, and optimizes the compression rate in response to the measured average storage time. The invention provides adaptive control of the bandwidth of processed data output to a storage device, to maintain transfer of the processed data to any desired storage device with optimal (for example, maximum attainable) bandwidth. In some embodiments, average throughput time for data transfers to and from a desired storage device is automatically measured, and an optimal compression rate is set in response to the measured time. The average throughput time for a video disk storage device can be measured by sending a sequence of words of varied length to the storage device and measuring the time elapsed for each of the words to be written onto and read back from a disk of the storage device.

8 Claims, 1 Drawing Sheet

VIDEO DATA COMPRESSION METHOD AND SYSTEM WHICH MEASURES COMPRESSED DATA STORAGE TIME TO OPTIMIZE COMPRESSION RATE

This is a continuation of application Ser. No. 08/205,959, filed Mar. 3, 1994, now U.S. Pat. No. 5,563,961.

FIELD OF THE INVENTION

The invention relates to methods and systems for compressing video signals, especially digital video data signals. More specifically, the invention is a method and system for compressing video signals in which the average required time for storing the compressed video is measured, and in which the compression rate is optimized in response to the measured average storage time.

BACKGROUND OF THE INVENTION

Throughout the specification (including in the claims) the terms "video data" and "video signal" are used to denote any of the broad class of image signals indicative of pixels of an image, including analog image signals and digital image signals.

Throughout the specification (including in the claims) the expression "disk storage device" is used to denote any of the broad class of devices which store data on one or more magnetic, optical, magneto-optic, or other disks. The term "disk" is used to denote any of such disks.

Throughout the specification (including in the claims) the expressions "external storage device" and "storage device" are used interchangeably to denote a storage device which is a member of the broad class of storage devices capable of storing compressed (or otherwise processed) data, and which is separate from a compression circuit or other processing circuit (including any buffer memory associated therewith) employed to generate the compressed (or otherwise processed) data to be stored therein. For example, disk storage device 14 (shown connected along bus 18 in FIG. 2) is an external storage device, capable of storing compressed video data generated in codec circuit 8 within circuit 6. Device 14 includes one or more magnetic, optical, magneto-optic, or other disks (the term "disk" is used to denote any of such disks).

Many methods and apparatus for compressing digital video data have been developed. An important class of conventional methods for digital video compression are compression methods which employ adaptive rate control to limit the output data rate (the rate at which compressed data are output) to a fixed value. Examples of conventional digital video compression methods with adaptive rate control are described in U.S. Pat. No. 5,231,484, issued Jul. 27, 1993 to Gonzalez, et al., U.S. Pat. No. 5,253,078, issued Oct. 12, 1993 to Balkanski, et al., and U.S. Pat. No. 4,394,774 issued Jul. 19, 1983 to Widergren, et al.

FIG. 1 is a block diagram of a typical conventional system for implementing digital video compression with adaptive rate control. In FIG. 1, compression/decompression ("codec") circuit 2 receives video data from video source 3, and can process the video data to generate compressed video data and then output the compressed video data to buffer memory 4. Buffer memory 4 has a fixed capacity. The compressed video data are then output from buffer 4 over a system bus. A video disk storage device (not shown) is typically connected along the bus for storing the compressed video data. Codec circuit 2 monitors the amount of buffer 4's capacity filled with compressed video data (the value X%, indicated in FIG. 1), and adjusts the flow rate of compressed video pixels into buffer 4 such that buffer 4 is never completely full or completely empty (to ensure that compressed data are output from buffer 4 to the system bus at a preselected constant rate).

Codec 2 and buffer 4 of FIG. 1 are typically implemented as a single piece of hardware (often a single integrated circuit). Compressed data are written to a storage device (connected along the system bus) from buffer 4 at a preselected fixed rate, to provide a controlled output bandwidth to the system bus from the hardware in which buffer 4 is implemented.

However, conventional video compression methods which implement adaptive rate control (including those of the type described with reference to FIG. 1), have serious limitations. One such limitation is that their output bandwidth cannot be automatically and adaptively controlled to maintain transfers of compressed video data therefrom to any of a variety of compressed video data storage devices (or other devices) with an optimal (e.g., maximum attainable) bandwidth which depends, in general, on the particular data storage device receiving the compressed video data signals.

SUMMARY OF THE INVENTION

In a class of embodiments, the invention is a method and system for processing and storing data in which the average time needed for storing the processed data in a data storage device is automatically measured, and a processing parameter is optimized in response to the measured average storage time. In preferred embodiments, the invention is a method and system for compressing and storing video data in which the average time needed for storing the compressed video in a storage device is automatically measured, and the compression rate is optimized in response to the measured average storage time. In these embodiments, the invention provides adaptive control of output bandwidth (to any specific data storage device employed to store the processed data generated by the invention) to maintain transfer of the processed data (e.g., compressed video) to any desired data storage device with optimal (e.g., maximum attainable) bandwidth.

In a class of embodiments, the inventive system include a means for measuring the average throughput time for data transfers to and from the data storage device, and for selecting an optimal value of the compression rate in response to measured average throughput time. In preferred embodiments of the system, the data storage device is a disk storage device and the average throughput time is measured by sending a sequence of words of varied length to the disk storage device and measuring the time elapsed for each of the words to be written onto a disk of the disk storage device and read back from the disk.

DETAILED DESCRIPTION OF THE PREFERRED EMBODIMENT

Figure 1:
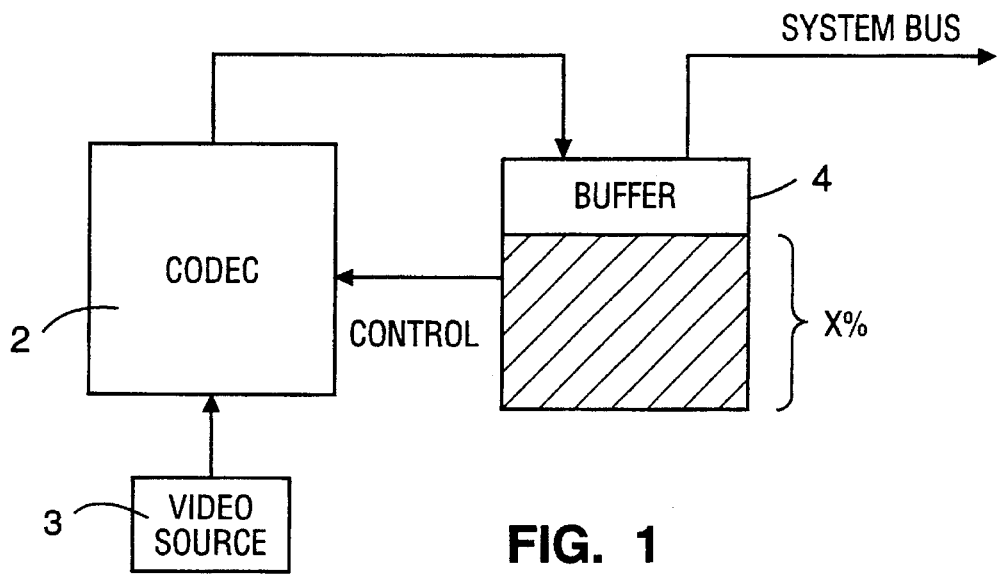
FIG. 1 is a block diagram of a conventional circuit including a video compression/decompression circuit and a buffer memory.
Figure 2:
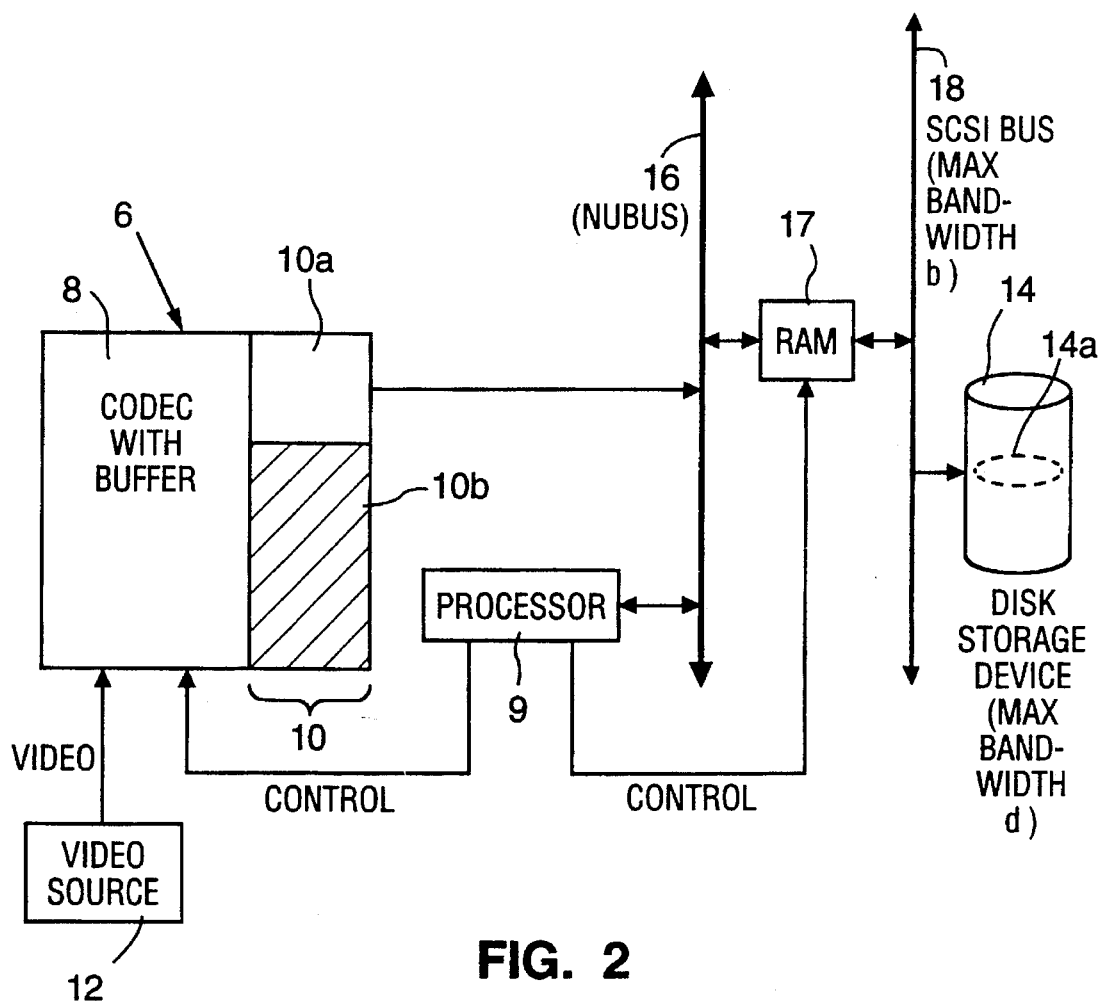
FIG. 2 is a block diagram of a system which embodies the invention.

A preferred embodiment of the inventive system will be described with reference to FIG. 2. Circuit 6 of FIG. 2 includes both codec circuit 8 (corresponding to codec 2 of FIG. 1), buffer memory 10 (corresponding to buffer 4 of FIG. 1). The FIG. 2 system also includes video source 12 (which can be a video camera, for example), circuit 6 (connected along system bus 16), disk storage device 14 (connected along bus 18), and random access memory 17 (RAM 17) connected both to bus 16 and bus 18. Disk storage device 14 includes one or more disks 14a for storing (compressed or uncompressed) video data.

In operation, codec 8 compresses input video data from source 12, and sends the compressed video data to buffer memory 10. The compressed video data are output from buffer memory 10 to system bus 16, and are then written into RAM 17. Data stored in RAM 17 are then read out onto bus 18 (under control of processor 9), and transferred over bus 18 to storage device 14.

Bus 16 is typically the system bus (e.g., a NUBUS) of a host computer in which circuit 6 is installed. Bus 18 is typically a SCSI bus.

Codec 8 compresses input video supplied to it from source 12 at a selected compression rate (a rate selected from a range of compression rates in response to a control signal from processor 9). The selected compression rate is the value Y%, where Y%=(number of input data bits received by codec 8)/(number of compressed data bits generated by codec 8 in response to the input data bits).

Codec 8 can implement any of a variety of variable rate compression methods, such as a compression method which satisfies the JPEG (or MPEG) standard.

Codec 8 typically includes circuitry for decompressing compressed video data which it may receive (in addition to circuitry for compressing uncompressed input video data which it may receive), but it need not include such decompression circuitry in all embodiments of the invention.

Buffer memory 10 includes portion 10b in which compressed video data have been stored, and portion 10a which does not contain stored compressed video data. Processor 9, which is programmed with software (to be described) for implementing the method of the invention, communicates with codec 8. In particular, processor 9 sends one or more control signals to codec 8. Alternatively, Codec 8 includes a microprocessor which is programmed with software for implementing the method of the invention. It is contemplated that in some embodiments, processor 9 will be programmed with some of the software for implementing the invention, and that a processor within codec 8 will be programmed with the remaining software for implementing the invention (such as specific routines called at appropriate times by processor 9). In all variations of the FIG. 2 system, a processor (e.g., processor 9) functions as a control means (or several processors, including processor 9, function together as a control means) for measuring the average throughput time for data transfers to and from storage device 14, selecting a desired compression rate in response to measured average throughput time, and generating a control signal which sets the compression rate applied by codec 8 to be the desired compression rate.

Bus 18 has a maximum bandwidth "b" and a normal realizable bandwidth which is some fraction of "b." Disk storage device 14 has a maximum bandwidth "d" and a normal realizable bandwidth which is some fraction of "d." Under control of the programmed processor of the invention (e.g., processor 9), the system performs tests to determine automatically what the overall attainable bandwidth (bit rate) for data transfers to and from disk 14a (within storage device 14) is likely to be, and then sets the compression rate control of codec 8 to an optimal value which does not exceed this amount. In a class of preferred embodiments, the optimal compression rate matches the overall attainable bandwidth for data transfers to and from disk 14a.

The overall attainable bandwidth for data transfers to and from disk 14a is determined by (and can thus be determined by measuring) the average throughput time for writing data to disk 14a and reading the data back from disk 14a. Preferably, the average throughput time is measured by sending a sequence of words of varied length from processor 9 to disk storage device 14 and measuring the time elapsed for each of the words to be written onto disk 14a and read back from disk 14a.

In a class of preferred embodiments, the invention measures both the read and write average throughput times of an individual disk system (i.e., the portion of device 14 employed to write data to and read data from disk 14a), and stores this measured data for subsequent processing (for example, to determine an optimal compression rate). The software for implementing the measurements preferably makes all measurements through the appropriate device driver (so as to include the "overhead" time of the device driver as well) but makes no direct SCSI or drive specific calls (so as to remain detached from any specific hardware or platform). It is contemplated that performance of the measurement operation may require substantial time (several seconds, or even a minute), and so it may be desirable to design the inventive system so that the measurement operation is performed automatically, but only in response to an operator request (such as by operator selection of an icon displayed, as part of a "disk characterization" menu, on a display device connected along bus 16).

In other embodiments, the invention measures both the read and write average throughput times of an individual disk system (i.e., the portion of device 14 employed to write data to and read data from disk 14a) during a recording operation, and processes the measured data (in a feedback control loop) to generate feedback signals for use for controlling the recording operation. For example, the feedback control signals can vary the compression rate during recording, to cause the compression rate to be optimal at all times during the recording operation. Such feedback control loop can also measure the percentage of buffer 10's capacity which has been emptied out to storage device 14, and control this percentage to be within desired limits.

In embodiments in which the invention measures average throughput time for writing data to one or more disks of a disk storage device and reading back the stored data, the measurement operation preferably begins by measuring the length of a data track on the disk storage device. This requires determining the number of sectors on a particular track. One way to measure the length of a data track, is for processor 9 to write a sequence of words of varying length to disk 14a, read the sequence of words of varying length from disk 14a, and note the time required for each read and write operation. In this case, processor 9 would be programmed to interpret the results of this operation by determining the maximum length word that can be written onto a single concentric track of disk 14a, and identifying the average time required to write such maximum length word to a single track and read back such maximum length word from the single track. More specifically, processor 9 issues a sequence of "butterfly address" requests (min - max), measures the response times, and weeds out the times which represent head switches and cylinder crossings.

By holding the requests to a single track (e.g., a track on disk 14a) and issuing subsequent requests for a total track (beginning at index), processor 9 can readily calculate the average latency times. It is important to note that this measurement should be made at various places throughout the disk to get a complete picture, since transfer times will vary according to head position relative to the outer diameter of the disk. When processor 9 has determined the latency times and measured throughput times, it can accurately calculate the true throughput times (in a manner that will be apparent to those of ordinary skill in the art).

In one embodiment in which codec 8 operates in response to control signals from processor 9 connected along system bus 16, processor 9 is the host processor of a Macintosh computer system (Macintosh is a trademark of Apple Computer, Inc.), and processor 9 is programmed with the commercially available software known as Macintosh Time Manager software and other software (identified below as "compression rate control" software for convenience) necessary for implementing the invention. During performance of the invention, the compression rate control software interfaces with the Macintosh Time Manager software to obtain the read time and write time values which the compression rate control software needs to determine an optimal compression rate and send a corresponding control signal to codec 8 (to cause codec 8 to operate at such optimal compression rate). By so employing the Macintosh Time Manager software (or software functionally equivalent thereto), the inventive system requires no special timing hardware.

It is contemplated that in alternative embodiments of the invention, the storage device to receive compressed video data can be a storage device (e.g., a tape storage device) other than a disk storage device. In all such embodiments, the inventive method includes the steps of measuring average throughput time (or the equivalent step of measuring the normal realizable bandwidth) for transfers to and from the storage device, selecting a desired compression rate in response to the measured throughput time (or bandwidth), and setting the compression rate (for data to be stored in the storage device) at the desired compression rate.

It is also contemplated that in other alternative embodiments of the invention, the invention processes data (other than by compressing video data) in a processing means, and stores the processed data in a storage device. The storage device can, but need not, be a disk storage device. In these alternative embodiments, the storage device can be connected as device 14 of FIG. 2 is connected, and the processing means can be connected as circuit 6 of FIG. 2 is connected. Examples of such processing include compression of audio (or other non-video) data, and encoding (other than by compression) of video or non-video data. In all these embodiments, the inventive method includes the steps of measuring average throughput time (or the equivalent step of measuring the normal realizable bandwidth) for data transfers to and from the storage device, selecting a desired processing rate in response to the measured throughput time (or bandwidth), and setting the processing rate (for data to be stored) at the desired processing rate. In preferred embodiments, the desired processing rate is such that the processed data are transferred to the storage device with a bandwidth matching the normal realizable bandwidth for transfers between the processing means and the storage device.

Various other modifications and alterations in the method and system of the invention will be apparent to those skilled in the art. Although the invention has been described in connection with specific preferred embodiments, it should be understood that the invention as claimed should not be unduly limited to such specific embodiments.

What is claimed is:

1. A system for compressing and storing video data, including:
    variable rate compression means for generating compressed video data by compressing input video data at a first compression rate selected from a range of compression rates in response to a control signal;
    a data storage device connected to the variable rate compression means, for storing the compressed video data; and
    control means, connected to the variable rate compression means and the data storage device, for measuring average throughput time for data transfer to and from the data storage device, selecting a desired compression rate in response to measured average throughput time, and generating the control signal so that said control signal sets the first compression rate to be said desired compression rate.

2. The system of claim 1, wherein the data storage device has a normal realizable bandwidth for data transfer thereto and therefrom, and wherein the first compression rate results in transfer of the compressed video data from the variable rate compression means to the data storage device with a bandwidth not exceeding said normal realizable bandwidth.

3. The system of claim 1, wherein the data storage device is a disk storage device.

4. A method for compressing and storing video data, including the steps of:
    (a) generating compressed video data by compressing input video data at a first compression rate selected from a range of compression rates in response to a control signal;
    (b) storing the compressed video data in a data storage device; and
    (c) before step (a), measuring average throughput time for data transfer to and from the data storage device, selecting a desired compression rate in response to measured average throughput time, and generating the control signal so that said control signal sets the first compression rate to be said desired compression rate.

5. The method of claim 4, wherein the data storage device has a normal realizable bandwidth for data transfer thereto and therefrom, and wherein the first compression rate results in transfer of the compressed video data to the data storage with a bandwidth not exceeding said normal realizable bandwidth.

6. A method for processing and storing data, including the steps of:
    (a) generating processed data by processing input data at a first processing rate selected from a range of processing rates in response to a control signal;
    (b) storing the processed data in a data storage device; and
    (c) before step (a), measuring average throughput time for data transfer to and from the data storage device, selecting a desired processing rate in response to measured average throughput time, and generating the control signal so that said control signal sets the first processing rate to be said desired processing rate.

7. The method of claim 6, wherein the input data are video data and the processed data are compressed video data.

8. The method of claim 6, wherein the data storage device has a normal realizable bandwidth for data transfer thereto and therefrom, and wherein the first processing rate results in transfer of the processed data to the data storage with a bandwidth not exceeding said normal realizable bandwidth.

* * * * *